United States Patent [19] [11] 4,303,757
Kajimura et al. [45] Dec. 1, 1981

[54] PROCESS FOR PRODUCING EXPANDABLE THERMOPLASTIC RESIN BEADS USING POLYPROPYLENE AS NUCLEUS

[75] Inventors: Mutsuhiko Kajimura, Moriyama; Hideaki Sasaki, Kusatsu, both of Japan

[73] Assignee: Sekisui Kaseihin Kogyo Kabushiki Kaisha, Nara, Japan

[21] Appl. No.: 207,423

[22] Filed: Nov. 17, 1980

Related U.S. Application Data

[63] Continuation of Ser. No. 951,880, Oct. 16, 1980, abandoned.

[30] Foreign Application Priority Data

Oct. 15, 1977 [JP] Japan ............................ 52/123783

[51] Int. Cl.$^3$ ............................ C08J 9/16; C08J 9/18
[52] U.S. Cl. ........................................ 521/59; 521/60; 521/139; 525/322
[58] Field of Search .................... 521/59, 60, 139, 140

[56] References Cited

U.S. PATENT DOCUMENTS

| | | | |
|---|---|---|---|
| 3,743,611 | 7/1973 | Muroi et al. | 521/98 |
| 3,959,189 | 5/1976 | Kitamori | 521/59 |
| 3,972,843 | 8/1976 | De Jong | 521/59 |

Primary Examiner—Morton Foelak
Attorney, Agent, or Firm—Armstrong, Nikaido, Marmelstein & Kubovcik

[57] ABSTRACT

A process for producing expandable thermoplastic resin beads which comprises suspending in an aqueous medium 20 to 70% by weight of polypropylene resin particles and 30 to 80% by weight of a vinyl aromatic monomer such as styrene, polymerizing the vinyl aromatic monomer in the presence of a polymerization catalyst to graft the vinyl aromatic monomer onto the backbone of polypropylene and, optionally, adding a cross-linking agent, to form graft-copolymerized thermoplastic resin beads, and introducing a blowing agent into the thermoplastic resin beads. The resulting resin beads have excellent foamability and molding fusability, and a foamed shaped article having superior thermal stability can be prepared from these beads.

9 Claims, No Drawings

PROCESS FOR PRODUCING EXPANDABLE THERMOPLASTIC RESIN BEADS USING POLYPROPYLENE AS NUCLEUS

This is a continuation of application Ser. No. 951,880, filed Oct. 16, 1980, now abandoned.

BACKGROUND OF THE INVENTION

1. Field of the Invention

This invention relates to a process for producing expandable thermoplastic resin beads, especially those which have superior foamability and the resulting foamed articles made from such beads provide good thermal stability.

2. Description of the Prior Art

Generally, it is easy to obtain polystyrene beads having a high expansion ratio. The resulting foamed articles made from such beads have high rigidity and good shape retention, but have the disadvantage in that they are fragile and have poor chemical resistance, oil resistance and thermal stability. Foamed products of polypropylene resin, on the other hand, have better elasticity, chemical resistance, oil resistance and thermal stability than polystyrene foams. However, polypropylene foams are too pliable, and are unsuitable for the preparation of shaped articles such as containers which retain a certain definite shape.

When polypropylene and polystyrene are simply mixed in an attempt to obtain a resin having the desirable characteristics of both polymers, a uniform mixture cannot be obtained. A foamed product prepared from such a mixture undergoes phase separation, and does not have an attractive appearance. Many investigations have been undertaken to remedy this disadvantage. For example, Japanese Patent Publication No. 26097/72 discloses a process for producing foamable pellets of a vinyl aromatic polymer which comprises heat-melting a vinyl aromatic polymer (polystyrene) containing 1 to 15% by weight, based on the total amount of the resin, of a polyolefin, pelletizing the melt, and impregnating the pellets with a blowing agent. According to this method, the amount of the polyolefin mixed is small, and since the vinyl aromatic polymer is simply physically mixed with the polyolefin, the two resins are not uniformly mixed and phase separation occurs. As a result, the impregnation of the blowing agent and the expansion ratio become non-uniform, and a uniform foamed article cannot be obtained. Moreover, because of the low polyolefin content, the pliability and elasticity of the resulting foamed product cannot be improved.

Japanese Patent Publication No. 32623/70 discloses a process for producing a foamable granular thermoplastic polymer which comprises dispersing in an aqueous medium a granular thermoplastic resin composed mainly of an aliphatic olefin resin, a polymerizable vinyl monomer capable of dissolving or swelling the thermoplastic resin, a polymerization catalyst and a cross-linking agent composed of an organic peroxide, introducing a blowing agent which is normally gaseous or liquid into the aqueous dispersion, and heating the mixture to a temperature at which the vinyl monomer has a solubilizing power for the aliphatic olefin resin and the heat also causes decomposition of the cross-linking agent, whereby the polymerization of the vinyl monomer, the impregnation of the blowing agent, and the cross-linking reaction occur simultaneously under pressure. Since the polymerization of the vinyl monomer, the impregnation of the blowing agent and the cross-linking reaction are performed simultaneously under pressure in this process, a special manufacturing apparatus is required, and the process has disadvantages for commercial mass production. In specific embodiments of this process, the content of polyolefin is very high, and, therefore, the resulting foamable pellets do not have a sufficient gas retaining property. Moreover, the resulting foamed product has the same properties as a foamed article of polyolefin alone.

SUMMARY OF THE INVENTION

The present inventors made investigations in order to obtain foamed resins having good properties due to the use of polypropylene such as superior chemical resistance and thermal stability, and good cushioning property. These investigations led to the discovery that expandable thermoplastic resin particles of good quality can be obtained by graft-polymerizing a vinyl aromatic monomer in the presence of a polymerization catalyst onto the backbone of polypropylene as a nucleus, and impregnating the resulting thermoplastic resin beads with a blowing agent.

According to one aspect of this invention, there is provided a process for producing thermoplastic resin beads which comprises suspending in an aqueous medium 20 to 70% by weight of polypropylene resin particles and 30 to 80% by weight of a vinyl aromatic monomer, adding a polymerization catalyst, and graft-polymerizing the vinyl aromatic monomer onto the backbone of polypropylene to form graft-copolymerized thermoplastic resin beads.

According to another aspect of the invention, there is provided a process for producing expandable thermoplastic resin beads, which comprises introducing a blowing agent composed of an easily volatilizable hydrocarbon or halogenated hydrocarbon into the aforesaid thermoplastic resin beads.

DETAILED DESCRIPTION OF THE INVENTION

In the process of this invention, the polypropylene resin denotes not only a homopolymer of propylene, but also a block copolymer containing polypropylene in an amount of at least 50% by weight and another polyolefin, and a mixture of at least 50% by weight of polypropylene and another polyolefin. In the present invention, the other polyolefin includes, for example, polyethylene, an ethylene/vinyl acetate copolymer, an ethylene/vinyl chloride copolymer, an ethylene/propylene rubber, polyisobutylene, butyl rubber, styrene/butadiene rubber, polybutene, and polybutadiene. These polyolefins are used either singly or as a mixture of two or more.

In order to cause rapid absorption of the vinyl aromatic monomer, the polypropylene resin is used in a particulate form. It is preferably in the form of spheres, flattened particles or pellets having a diameter of about 0.5 to 10 mm.

Examples of vinyl aromatic monomer used in the process of this invention are styrene, α-methylstyrene, ethylstyrene, chlorostyrene, bromostyrene, vinyltoluene, vinylxylene, and isopropylxylene. These monomers may be used either alone or in admixture. A mixture of at least 50% of the vinyl aromatic monomer and a monomer copolymerizable with it, such as acrylonitrile, methyl methacrylate or methyl acrylate can also be used.

The polymerization catalysts used in the process of this invention include, for example, organic peroxides such as benzoyl peroxide, tertiary butyl perbenzoate, lauroyl peroxide, tertiary butyl peroxy-2-ethylhexanate and tertiary butyl peroxide, and azo compounds such as azobisisobutyronitrile and azobisdimethylvaleronitrile.

In the process of this invention, a cross-linking agent is not always necessary, but may be added. Examples of such cross-linking agent are di-t-butyl peroxide, t-butyl cumyl peroxide, dicumyl peroxide, α,α-bis(t-butyl peroxy)-p-di-isopropylbenzene, 2,5-dimethyl-2,5-di(t-butyl peroxy)-hexyne-3, 2,5-dimethyl-2,5-di(benzoyl peroxy)hexane, and t-butyl peroxy isopropyl carbonate. The cross-linking agent is used generally together with a cross-linking promotor. Examples of cross-linking promotors include functional vinyl compounds such as divinylbenzene, polyethylene glycol dimethacrylate, triallyl cyanurate, diallyl phthalate, 1,3-butadiene, 1,2-polybutadiene and 1,4-polybutadiene; quinone dioxime; and bisamide.

The process of this invention is described specifically. First, the polypropylene resin is suspended in an aqueous medium containing a dispersing agent. The dispersing agent may, for example, be polyvinyl alcohol, methyl cellulose, calcium phosphate, magnesium pyrophosphate, calcium carbonate, etc. The amount of the dispersing agent employed is 0.01 to 5% by weight based on the amount of water. Then, a vinyl aromatic monomer such as styrene monomer and a polymerization catalyst are added to the resulting suspension containing the polypropylene resin particles dispersed therein. These materials may be added all at one time, or gradually in small portions. The vinyl aromatic monomer and the polymerization catalyst may be added separately. Or the polymerization catalyst may be first dissolved in, or mixed with, the vinyl aromatic monomer, and the solution or mixture then added. The polymerization catalyst may be used as a solution in a solvent which does not hamper the polymerization reaction. Examples of solvents that can be used for this purpose include toluene, benzene and 1,2-dichloropropane.

In one embodiment of the present invention, the aqueous medium is heated to a temperature at which the vinyl aromatic monomer can be polymerized, and then the vinyl aromatic monomer and the polymerization catalyst are added. Alternatively, these materials are added at room temperature, and then the suspension is heated to the polymerization temperature. When the cross-linking agent is used in the process of this invention, it may be used by dissolving in the vinyl aromatic monomer, or in the solvent for the polymerization catalyst. When the vinyl aromatic monomer is used in a relatively large amount, it is desirable to add the vinyl aromatic monomer gradually in small portions to the suspension in order to prevent the formation of a homopolymer of the vinyl aromatic monomer.

The vinyl aromatic monomer added to the suspension penetrates into the inside portion of the polypropylene resin particles and is there polymerized, or polymerized and cross-linked, in the polypropylene resin particles. As the result of this reaction, graft polymerization and homopolymerization of the vinyl aromatic monomer take place simultaneously. In this reaction, 20 to 70% by weight of the polypropylene resin particles and 30 to 80% by weight of the vinyl aromatic monomer are used. When the amount of the vinyl aromatic monomer is smaller than that above-specified, a foamed structure having superior rigidity and shape retention cannot be obtained. On the other hand, when the amount of the vinyl aromatic monomer is larger than the upper limit specified, the thermal stability and oil resistance of the resulting foamed product are deteriorated. Accordingly, the proportions of the polypropylene resin particles and the vinyl aromatic monomer employed should be in the range of from 20 to 70% by weight, preferably from 50 to 30% by weight, of the polypropylene resin particles, and from 30 to 80% by weight, preferably from 50 to 70% by weight, of the vinyl aromatic monomer.

The vinyl aromatic monomer added to the suspension is rapidly absorbed into the inside portion of the polypropylene resin particles, and polymerized, or polymerized and cross-linked, within the polypropylene resin particles. Thus, the thermoplastic resin beads in accordance with this invention are obtained. The resulting thermoplastic resin particles consist of polypropylene, a vinyl aromatic homopolymer and a polypropylene-vinyl aromatic graft polymer. Since the above reaction gives thermoplastic resin beads containing the polypropylene-vinyl aromatic graft polymer, phase separation seen in the case of mixing polypropylene resin and the vinyl aromatic polymer does not occur, and, thus, this graft polymer exhibits a binder effect of increasing compatibility between the polypropylene resin and the vinyl aromatic homopolymer. For this reason, the polypropylenevinyl aromatic graft polymer is required in an amount of at least 2%. If its proportion is less than 2%, the binder effect is not sufficient, and partial phase separation occurs in the resulting resin beads.

The cross-linked polymer, if prepared by the process of this invention, precipitates as an insoluble portion (gel) when dissolved in hot toluene, xylene, etc. The amount of the reaction product resulting from the grafting of the vinyl aromatic monomer to polypropylene is determined by the weight increase from the initial amount of polypropylene used, which, in turn, is determined from the residue of extraction with a 1:1 boiling mixture of acetone and benzene. The presence of the gel or the graft reaction product improves the retention of the blowing agent by the resulting thermoplastic resin beads and the molding fusability of the resin beads at the time of foaming.

In the process of this invention, for example, a blowing agent is impregnated under pressure in the resulting thermoplastic resin beads in the aqueous suspension. The suspending agent used in the aqueous suspension is added in order to prevent bonding or coalescing of the thermoplastic resin beads during impregnation of the blowing agent. Examples of the suspending agent are organic compounds such as partially saponified polyvinyl alcohol, polyacrylic acid salt, polyvinyl pyrrolidone, carboxymethyl cellulose, calcium stearate and ethylenebis stearamide, and sparingly water-soluble fine powders of inorganic compounds such as calcium pyrophosphate, calcium phosphate, calcium carbonate, magnesium carbonate, magnesium phosphate, magnesium pyrophosphate and magnesium oxide. When an inorganic compound is used as the suspending agent in the process of this invention, it should be desirably used together with a surface active agent such as sodium dodecylbenzenesulfonate.

Easily volatilizable blowing agents are used in the process of this invention. Examples of blowing agents include aliphatic hydrocarbons such as propane, n-butane, i-butane, n-pentane, i-pentane and n-hexane, cycloaliphatic hydrocarbons such as cyclopentane and cyclohexane, and halogenated hydrocarbons such as methyl chloride, ethyl chloride, dichlorodifluoromethane, chlorodifluoromethane and trichlorofluoromethane. These blowing agents are used in an amount of generally in the range of from 3 to 40% by weight based on the weight of the thermoplastic resin beads. A small amount (for example, 1 to 5% by weight) of an organic solvent such as toluene or xylene may be used together therewith.

The impregnation of the blowing agent is performed, for example, by suspending the thermoplastic resin beads in water containing the suspending agent in an autoclave, heating the suspension, and introducing the blowing agent under pressure. This procedure affords expandable thermoplastic resin beads. Impregnation may also be accomplished by, for example, dipping the thermoplastic resin beads into a liquid organic blowing agent after the beads have been prepared.

The expandable thermoplastic resin beads obtained by the process of this invention can be formed into a foamed shaped article of a desired configuration by pre-foaming the beads and foaming and shaping them in a mold cavity. The resulting foamed shaped article has superior thermal stability, chemical resistance (e.g., oil resistance), and flexural strength due to foamed polypropylene. In particular, when the foamed article is used as an underlayer of a roofing material to be subject to high temperatures, it is not shrunk nor softened by heat, and, therefore, it finds extensive use as a heat insulating material for a cooler or refrigerator, a sound insulating material, or a cushioning material.

Since according to the process of this invention, the blowing agent is impregnated after the thermoplastic resin beads have been prepared, it is not necessary to use a high pressure reactor for polymerization and, optionally, cross-linking, and polymer beads can be very easily obtained. While it has previously been thought that cross-linking before the impregnation of a blowing agent causes difficulty of impregnation of the blowing agent (Japanese Patent Publication No. 32622/70), the process of this invention makes it possible to obtain sufficiently expandable resin beads by first performing polymerization and, optionally, cross-linking, and thereafter impregnating the blowing agent. According to the process of this invention, therefore, thermoplastic resin beads can be obtained prior to the impregnation of the blowing agent by polymerizing the vinyl aromatic monomer with polypropylene resin particles in the presence of a polymerization catalyst and, optionally, a cross-linking agent to induce graft polymerization or both graft polymerization and cross-linking. These resin beads can be formed into expandable thermoplastic resin beads in the manner described hereinabove. These resin beads can also be used as a resin for extrusion shaping. For example, it is possible to feed these resin beads into an extruder, force a blowing agent into it, and extrude a foamed sheet, plate or rod.

Furthermore, according to the process of this invention, it is possible to add a fire retarding agent, a coloring agent, an antistatic agent, etc.

The following Examples illustrate the present invention. Unless otherwise specified, all parts and percentages are by weight.

EXAMPLE 1

Forty (40) parts of polypropylene (MI 8.0) which had been pelletized to a diameter of 1 mm to 3 mm by an extruder was dispersed in a mixture consisting of 150 parts of water, 0.2 part of magnesium pyrophosphate prepared by the double decomposition-method and 0.02 part of sodium dodecylbenzenesulfonate. While maintaining the dispersion at 85° C., a solution of 0.3 part of benzoyl peroxide, 1.0 part of dicumyl peroxide and 1.0 part of 1,2-polybutadiene in 60 parts of styrene monomer was added dropwise over the course of 7 hours. After the addition, the reaction was conducted at 140° C. for 4 hours. The reaction product was cooled to obtain polymer beads. Then, a pressure reactor was charged with 100 parts of the resulting polymer beads, 100 parts of water, 0.02 part of sodium dodecylbenzenesulfonate and 0.2 part of magnesium pyrophosphate, and 20 parts of butane was introduced under pressure. The mixture was maintained at 80° C. for 6 hours. The mixture was then cooled to 30° C., dehydrated and dried to obtain expandable thermoplastic resin beads. The resin beads were maintained in an environment at 20° C. in a closed vessel, and pre-foamed 3 to 4 days later. These resin beads did not expand when contacted with hot water or steam at 100° C., but by heating them with steam or an oil bath at 110° to 150° C., a foamed structure having uniform closed cells was obtained.

The pre-expanded resin beads were placed into a mold having vapor holes, and steam under a pressure of about 5.0 kg/cm$^2$ (gauge) was introduced for 30 to 180 seconds. Then, the resulting foamed product was cooled with water, and removed from the mold. The resulting foamed product had an expansion ratio of about 14.

The resin beads were immersed in boiling toluene for 16 hours, cooled, and then filtered. The insoluble portion was dried under reduced pressure for 3 hours in an oven at 120° C. The percentage of the weight of the dried insoluble portion (gel concentration %) based on the weight of polypropylene resin in the sample was measured, and found to be 0.3%.

The resin particles were extracted for 6 hours with a 1:1 boiling mixture of acetone and benzene. The residue was dried. From the amount of the residue, the weight increase (graft ratio) from the polypropylene resin was determined to be 11%.

In the same way as above, resin beads were produced by using polypropylene particles having an MI value of 1.3, and a blowing agent was introduced. The expandable resin beads were then expanded with steam under a pressure of 4 kg/cm$^2$. The expansion ratio was 15, i.e., the expanded beads were 15 times larger than the beads before expanding with steam. The graft ratio was 9%, and the gel concentration was 2.4%.

EXAMPLES 2 TO 5 AND COMPARATIVE EXAMPLES 1 AND 2

Example 1 was repeated except that the ratio of polypropylene (MI 8.0) to styrene monomer was changed as shown in Table 1. The results are shown in Table 1.

In Comparative Example 1, the amount of polypropylene was more than 70%, and in Comparative Example 2, the amount of polypropylene was less than 20%.

TABLE 1

| Example No. | Ratio of Polypropylene to Styrene | Gel Concentration (%) | Pressure at the Time of Foaming (kg/cm²) | Expansion Ratio | Molding Fusability | Dimensional STability | Graft Ratio (%) |
|---|---|---|---|---|---|---|---|
| 2 | 60:40 | 5 | 4.5 | 14 | Δ | o | 12 |
| 3 | 40:60 | 0.3 | 4.2 | 18 | o | o | 11 |
| 4 | 30:70 | 0.2 | 4.0 | 28 | o | Δ | 6 |
| 5 | 70:30 | 7 | 5.0 | 12 | Δ | o | 15 |
| Comparative Example 1 | 75:25 | 10 | 4.7 | 10 | x | o | 17 |
| Comparative Example 2 | 17:83 | 0.2 | 3.8 | 30 | o | x | 4 |

The properties of the foamed products were measured by the following methods.

Gel Concentration (%)

Polymer beads obtained by polymerization were extracted with boiling toluene for 16 hours, cooled, and then filtered. The insoluble portion was dried under reduced pressure for 3 hours in an oven at 120° C. The percentage of the weight of the dried insoluble portion based on the polymer beads was determined, and made the gel concentration.

Expansion Ratio

This refers to the expansion ratio of expandable thermoplastic resin beads to expanded beads which were prefoamed four days after preparation. For example, in Example 2, the expandable beads = 1 and the expanded beads = 14. Therefore, expansion ratio = 1:14.

Molding Fusability

The molded product was broken by hand. When individual shapes of foamed beads did not appear at all on the fractured surface, the molding fusability was determined to be 100%. When the fractured surface was entirely a surface showing individual shapes of foamed beads, the molding fusability was determined to be 0%. The percentage of foamed particles at the fractured surface was thus determined, and the molding fusability was evaluated by o which shows that the percentage is more than 80%, Δ which shows that the percentage is 80 to 40%, and x which shows that the percentage is less than 40%.

Dimensional Stability

The sample was allowed to stand for 24 hours in a hot air constant-temperature tank at 100° C., and the dimensional shrinkage of the sample compared with the original dimension was determined. The dimensional stability was evaluated by o which shows that the shrinkage was not more than 5%, Δ which shows that the shrinkage was 6 to 15%, and x which shows that the shrinkage was at least 16%.

Graft Ratio

The sample was extracted with a 1:1 boiling mixture of acetone and benzene for 6 hours, and the extraction residue was dried until its weight became constant. The graft ratio was calculated in accordance with the following equation.

$$\text{Graft Ratio} = \frac{W_i - W_0 \times X}{W_0} \times 100$$

$W_0$ = the weight of the sample
$W_i$ = the weight of the extraction residue
$X$ = the proportion of polypropylene in the sample It can be seen from the Comparative Examples that when the proportion of polypropylene is larger than the specified limit, the resulting foamed product has good dimensional stability, but the expansion ratio and molding fusability are deteriorated, and when the proportion of polypropylene is smaller than the specified limit, the expansion ratio is good, but the dimensional stability is poor.

EXAMPLES 6 AND 7

Example 1 was repeated except that a block copolymer of propylene and ethylene was used instead of the polypropylene, and 40% of the copolymer and 60% of styrene monomer were used. The results are shown in Table 2.

TABLE 2

|  | Example 6 | Example 7 |
|---|---|---|
| Amount of Polyethylene (%) | 4 | 15 |
| Melt Index | 8 | 1.5 |
| Gel Concentration (%) | 4.0 | 10 |
| Pressure at the Time of Foaming (kg/cm²) | 4.2 | 4.5 |
| Expansion Ratio | 15 | 16 |
| Molding Fusability | o | o |
| Dimensional Stability | o | o |

EXAMPLE 8

Example 1 was repeated except that a mixture of polypropylene (MI 8.0) with 15% of low-density polyethylene was used instead of polypropylene alone. A foamed article having an expansion ratio of 15 (vapor pressure at the time of foaming 4.2 kg/cm²) was obtained. The molding fusability and dimensional stability were good.

While the invention has been described in detail and with reference to specific embodiments thereof, it will be apparent to one skilled in the art that various changes and modifications can be made therein without departing from the spirit and scope thereof.

What is claimed is:

1. A process for producing expandable thermoplastic resin beads which comprises suspending in an aqueous medium from 20 to 70% by weight of polypropylene resin particles and from 30 to 80% by weight of a vinyl aromatic monomer, polymerizing the vinyl aromatic monomer in the presence of a polymerization catalyst to graft the vinyl aromatic monomer onto the backbone of the polypropylene to form graft-copolymerized thermoplastic resin beads, and thereafter introducing a blowing agent composed of an easily volatilizable hydrocarbon or halogenated hydrocarbon into the thermoplastic resin beads.

2. The process of claim 1, wherein the amount of the polypropylene resin particles employed is from 50 to 30% by weight, and the amount of the vinyl aromatic monomer is from 50 to 70% by weight.

3. The process of claim 1, wherein the polypropylene resin particles are particles of a homopolymer of propylene, a block copolymer of polypropylene and another polyolefin containing at least 50% by weight of the polypropylene, or a mixture of at least 50% by weight of polypropylene and another polyolefin.

4. The process of claim 1, wherein the vinyl aromatic monomer is at least one monomer selected from the group consisting of styrene, α-methylstyrene, ethylstyrene, chlorostyrene, bromostyrene, vinyltoluene, vinylxylene and isopropylxylene, or a mixture of at least 50% by weight of at least one of said monomers with another monomer copolymerizable therewith.

5. The process of claim 1, wherein the polymerization is carried out in the further presence of a cross-linking agent.

6. The process of claim 1, wherein the blowing agent is introduced into the resin beads under pressure while in the aqueous suspension.

7. The process of claim 1, wherein the blowing agent is introduced into the resin beads by dipping the beads into a liquid organic blowing agent.

8. In a process for producing expandable thermoplastic resin beads which comprises suspending in an aqueous medium containing 0.01 to 5% by weight, based on water present in the aqueous medium, of a dispersing agent selected from the group consisting of polyvinyl alcohol, methyl cellulose, calcium phosphate, magnesium pyrophosphate and calcium carbonate, from 20 to 70% by weight of polypropylene resin particles and from 30 to 80% by weight of a vinyl aromatic monomer, polymerizing the vinyl aromatic monomer in the presence of a polymerization catalyst to graft the vinyl aromatic monomer onto the backbone of the polypropylene to form graft-copolymerized thermoplastic resin beads, and thereafter introducing a blowing agent composed of an easily volatilizable hydrocarbon or halogenated hydrocarbon into the thermoplastic resin beads, the improvement comprising heating the aqueous medium to a temperature at which the vinyl aromatic monomer can be polymerized before adding the vinyl aromatic monomer and the polymerization catalyst thereto, and adding said vinyl aromatic monomer and said polymerization catalyst to the heated aqueous medium.

9. The process of claim 8, wherein the polymerization is carried out in the further presence of a cross-linking agent.

* * * * *